Patented Mar. 6, 1923.

1,447,689

UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS OF REACTIVATING SPENT CATALYZERS.

No Drawing. Application filed March 12, 1918, Serial No. 222,006. Renewed July 22, 1922. Serial No. 576,868.

*To all whom it may concern:*

Be it known that I, WILLIAM D. RICHARDSON, a citizen of the United States, residing at Chicago, in the county of Cook, State of Illinois, have invented certain new and useful Improvements in Processes of Reactivating Spent Catalyzers; and I do hereby declare the following to be a full, clear, and exact description of the invention, such as will enable others skilled in the art to which it appertains to make and use the same.

This invention relates to improvements in the reactivating of spent catalyzers.

The invention is based upon the discovery that the catalytic activity of spent catalyzers can be increased, and the catalyzers thereby made more active, by subjecting them, in admixture with oil, to the action of hydrogen at an elevated temperature.

The invention is of particular value as applied to so-called metallic catalyzers which are used in the hydrogenation of fatty oils.

The catalyzers which may be reactivated, or which may have their catalytic activity increased, by treatment in accordance with the present invention, are of various kinds. They may be such as are produced by chemical means, for example, by thermal decomposition or by reduction of reducible nickel compounds with hydrogen, usually at elevated temperatures, or they may be such catalyzers as are produced by mechanical means, for example, finely divided nickel catalyzers produced by abrasion. The catalyzers may thus be recovered or regenerated catalyzers, for example, such as are produced in accordance with the process of my co-pending application, Serial No. 222,007, filed March 12, 1918, by subjecting finely divided spent nickel or other catalyzers to a resurfacing or reactivating treatment by mechanical means, such as abrasion. The catalyzers, accordingly, may be either metallic catalyzers or catalyzers containing more or less oxygen or oxide.

According to the present invention, the finely divided catalyzer, for example, the resurfaced or reactivated catalyzer above referred to, is introduced into a suitable vessel or receptacle, and heated therein, in admixture with oil, to a temperature of say 200 to 250° C., and hydrogen is bubbled or otherwise passed through the mixture or the mixture brought into contact therewith. Various means may be utilized for bringing about the desired intimate intermixture of the hydrogen with the suspended catalyzer particles, such as stirring, bubbling, spraying and various other familiar means of agitation or intermixture.

The treatment is continued, in the manner described, for periods of time which will vary with different catalyzers and with the degree of reactivation or increased activity which is desired or which is feasible. A relatively short period of time will usually be sufficient, but the period of treatment can be readily determined by following the progress of the action and taking samples from time to time and testing them for increased activity by any well known means, such as, for example, utilizing the catalyzer on a small scale for carrying out the reaction for which it is intended, for example, for the catalytic hydrogenation of fatty oils.

It will be evident that the oil admixed with the catalyzer should be of a character which will withstand, without danger of objectionable decomposition, the temperatures to which the oily catalyzer are heated, and for the period during which the heating is continued. When unsaturated oils are admixed with the catalyzer, some hydrogenation thereof will take place at the same time that the reactivating or increased activation of the catalyzer takes place. When a partially hydrogenized oil is present, further hydrogenation thereof will take place in a similar manner. The resulting product will accordingly be a catalyzer of increased activity in suspension in the oily vehicle which will itself be of a more or less completely hydrogenated character, when this oily vehicle is one capable of hydrogenation under the conditions utilized.

The amount of oil used may, of course, vary, but inasmuch as the reactivating or increased activation of the catalyzer is the immediate and primary object, a considerable excess of oil will not be necessary or usually desirable, provided the catalyzer is maintained in a state of mobile suspension so that the hydrogen may be brought into contact therewith. Where the catalyzer is thus present in very large amount, and the oil in relatively small amount, an energetic hydrogenation of unsaturated oil constituents present is to be expected, and this hydrogenation may go to substantial completion during the catalyzer treatment.

At the end of the process, the reactivated catalyzer, or the catalyzer of increased activity, will be present in suspension in oil and available for adding to larger batches of oil, or otherwise utilized, for the catalytic hydrogenation of fatty oils generally, such as the fatty acids and their glycerids or esters.

Experience has shown that the process of the present invention is of special value as an additional step in the reactivation of spent catalyzer, in accordance with the mechanical "resurfacing" or rejuvenating of spent catalyzer which forms the subject matter of my co-pending application Serial No. 222,007, filed March 12, 1918; and that a still more active regenerated catalyzer can be thereby obtained in many or most cases. The mechanically "resurfaced" or regenerated catalyzer particles are thereby subjected to what may, perhaps, be considered a "hydrogenation" treatment. The regenerated catalyzers thus produced, in case of finely divided nickel catalyzers, are suspensions of the catalyzer particles in the oil present during the hydrogen treatment, unless, of course, this oil is partly or wholly separated from the catalyzer particles.

In the use of catalyzers for the hydrogenation of oil it is well known that the catalyzers progressively lose their catalytic activity and, after repeated or prolonged use, become inert, and no longer perform their proper catalytic function or perform it so slowly as to be of no practical value. The running down or depreciation of the catalytic activity is probably due to absorption or adsorption by the catalyzer of various gases or other compounds, such as sulfur or phosphorous compounds, which render the catalytic surfaces inactive or decrease their activity.

It is customary in the art, when such catalyzers have become spent or reach a condition of low activity, to separate them from the oil or other material and then to recover or regenerate the catalyzers by chemical means, such as solution of the spent metal catalyzer in acid, conversion of the dissolved metal into the form of a reducible compound, and reduction thereof with hydrogen at an elevated temperature.

In my companion application Serial No. 222,007, I have described the regeneration or reactivation of spent catalyzers by subjecting them to a resurfacing treatment, for example, by grinding or abrading the spent catalyzer, admixed with oil, in a ball mill, whereby the spent catalyzer particles are freed from their inert or inactive surfaces, and the surfaces thereof so modified or renewed that resurfaced catalyzers of high catalytic activity are produced.

The process of the present invention, as above pointed out, is particularly adapted for the treatment of resurfaced catalyzers of the character referred to, and results in a further increase of the catalytic activity of such catalyzers. While I do not wish to limit myself by any theoretical explanation of the improvements which result from the process of the present invention, nevertheless it seems probable that the hydrogenation of the catalyzer in the presence of a small amount of oil results in the hydrogen replacing absorbed gases which interfere with the activity of the catalyst. The action seems to be the reverse of that which takes place during the normal hydrogenation process in which a small amount of nickel, even as little as a fraction of a per cent, is present in a large amount of oil; and the increase in catalytic activity, rather than a decrease, is probably due to the effect of mass action, the large excess of hydrogen acting upon the catalyzer admixed with a small amount of oil so that the nickel is primarily acted upon and its condition so modified that its catalytic activity is thereby materially increased.

In accordance with the law of mass action it is to be expected that a large excess of hydrogen at an elevated temperature will replace other gases which may have been adsorbed or absorbed by the nickel during the usual hydrogenation process, so that these other gases or other impurities having a retarding effect upon the catalytic activity would either be split off or given up or changed so that the catalytic activity is increased.

What I claim is:

1. The method of increasing the activity of finely divided spent catalyzers which comprises treating the same, in admixture with a relatively small amount of oil, with hydrogen at an elevated temperature of about 200° to 250° C. until reactivation thereof has been effected; substantially as described.

2. The method of increasing the activity of mechanically "resurfaced" or rejuvenated finely divided catalyzers, which comprises treating the same, in admixture with a relatively small amount of oil, with hydrogen at an elevated temperature of about 200° to 250° C. until increased activation thereof has been effected; substantially as described.

In testimony whereof I affix my signature.

WILLIAM D. RICHARDSON.